United States Patent

Nakayama et al.

Patent Number: 5,190,418
Date of Patent: Mar. 2, 1993

[54] ROTARY CUTTER

[75] Inventors: Masaaki Nakayama; Masayuki Okawa; Junichi Saito, all of Ibaraki, Japan

[73] Assignee: Mitsubishi Materials Corporation, Tokyo, Japan

[21] Appl. No.: 857,443

[22] Filed: Mar. 25, 1992

[30] Foreign Application Priority Data

Mar. 28, 1991 [JP] Japan .................................. 3-27342

[51] Int. Cl.$^5$ .............................................. B23C 5/20
[52] U.S. Cl. ....................................... 407/42; 407/113
[58] Field of Search ...................... 407/30, 33, 34, 42, 407/61, 113, 114, 51, 55, 56, 58

[56] References Cited

U.S. PATENT DOCUMENTS

| 3,486,210 | 12/1969 | Greenleaf. | |
|---|---|---|---|
| 3,486,211 | 12/1969 | Greenleaf. | |
| 4,645,384 | 2/1987 | Shimomura et al. | 407/42 |
| 4,808,044 | 2/1989 | Tsujimura et al. | 407/34 X |
| 5,056,963 | 10/1991 | Kameno et al. | 407/113 X |

FOREIGN PATENT DOCUMENTS

| 104517 | 4/1984 | European Pat. Off. . |
| 60646 | 6/1970 | Luxembourg . |
| 159315 | 7/1986 | Japan . |

Primary Examiner—Steven C. Bishop

[57] ABSTRACT

A rotary cutter is disclosed which includes a cutter body having an axis of rotation therethrough and a cutting insert releasably secured to a forward end of the cutter body. The cutting insert has marginal ridges defining a main cutting edge and an auxilliary cutting edge. The main cutting edge is directed radially outwardly of the cutter body while the auxiliary cutting edge is directed axially forwardly of the cutter body. The cutting insert has faces defining a first rake surface and a second rake surface. The first rake surface is disposed adjacent to the main and auxiliary cutting edges such that an axial rake angle is no less than +30°. The second rake surface is disposed between the first rake surface and the auxiliary cutting edge such that an angle, defined between the second rake surface and the axis of rotation of the body as viewed in a cross-section perpendicular to the auxiliary cutting edge, is no larger than °20°. The second rake surface is formed such that a distance, measured in a direction parallel to the first rake surface and defined between the auxiliary cutting edge and the intersection of the first rake surface with the second rake surface, is set so as to range from 0.5 mm to 1.5 mm.

4 Claims, 6 Drawing Sheets

ROTARY CUTTER

BACKGROUND OF THE INVENTION

1. Field of the Invention

The present invention relates to rotary cutters such as a face milling cutter, a side milling cutter or the like, and in particular to improvements for strengthening a cutting edge thereof while permitting the application of a large rake angle to reduce a cutting load exerted thereon.

2. Prior Art

FIGS. 8 to 13 depict a conventional face milling cutter 1, which comprises a cutter body 2 having an axis of rotation therethrough and having a plurality of chip pockets 5 formed in circumferentially distributed relation to one another so as to open to a forward axial face 3 and a circumferential surface 4. An insert receiving recess 6 is formed in the wall of each chip pocket facing in a direction of rotation of the body 2, and a generally square, indexable cutting insert 7 formed of cemented carbide is received in each insert receiving recess 6 with a seat member 8 and a supporter 9 interposed therebetween, and is releasably secured thereto by means of an insert securing wedge 10 and a supporter securing wedge 11.

The face milling cutter 1 is provided with a main cutting edge 12 directed radially outwardly and an auxiliary cutting edge 13 directed axially forwardly of the tool body 2, and cuts a workpiece by these cutting edges.

In the face milling cutter 1 as described above, the axial rake angle for the cutting edge is determined appropriately by taking the cutting conditions into consideration. When the axial rake angle is set so as to be positive and large, cutting chips of helical shapes are produced, and the cutting load is reduced. Such a tool is paticularly effective for the prevention of chattering, and can be suitably used for cutting a workpiece of less rigidity or for a cutting operation with a machine of less power. However, when the axial rake angle is made large, the included angle is increased since an appropriate relief angle (5° to 6°) must be ensured. Accordingly, the strength of the cutting edge deteriorates, and the resulting tool is susceptible to fracturing when cutting a surface as forged or a hard workpiece.

In order to circumvent the above problems, the face milling cutter has been conventionally modified as shown in FIGS. 10 to 12, in which the main and auxiliary cutting edges 12 and 13 are honed to provide honed portions 14 of a prescribed width S, which are inclined with respect to the rake surface at a prescribed inclination angle $\theta$, whereby the strength of the cutting edges are enhanced. In this modification, however, when the axial rake angle $A_1$ is increased to above 30° as indicated by a two-dot chain line in FIG. 13, the included angle $\beta$ for the auxiliary cutting edge 13 becomes less than 55°. Therefore, the above modification of the tool is not successful in obtaining a sufficient strength at the cutting edge, and the cutting edges of the resulting tool are still susceptible to fracturing.

SUMMARY OF THE INVENTION

It is therefore an object and feature of the present invention to provide a rotary cutter which has an increased strength at the cutting edge, and in which cutting load exerted on the cutting edge can be substantially reduced by imparting a large rake angle thereto.

According to the present invention, there is provided a rotary cutter comprising:

a cutter body having an axis of rotation therethrough; and a cutting insert releasably secured to a forward end of the cutter body, the cutting insert having marginal ridges definig a main cutting edge and an auxiliary cutting edge, the main cutting edge being directed radially outwardly of the cutter body while the auxiliary cutting edge is directed axially forwardly of the cutter body;

the cutting insert having faces defining a first rake surface and a second rake surface, the first rake surface being disposed adjacent to the main and auxiliary cutting edges such that an axial rake angle is no less than +30°, the second rake surface being disposed between the first rake surface and the auxiliary cutting edge such that an angle, defined between the second rake surface and the axis of rotation of the body as viewed in a cross-section perpendicular to the auxiliary cutting edge, is no larger than +20°, the second rake surface being formed such that a distance, measured in a direction parallel to the first rake surface and defined between the auxiliary cutting edge and the intersection of the first rake surface with the second rake surface, is set so as to range from 0.5 mm to 1.5 mm.

In the above rotary cutter, the second rake surface is formed between the main cutting edge and the auxiliary cutting edge so as to be inclined at an inclination angle of no larger than +20° with respect to the axis of the tool body. Therefore, even if the axial rake angle is set to above +30°, a large included angle can be ensured at the main cutting edge, so that the chipping of the cutting edge can be prevented.

If the angle defined between the second rake surface and the axis of the tool body exceeds +20°, the cutting load is increased, and the cutting edge is susceptible to fracturing. Furthermore, if the distance between the auxiliary cutting edge and the marginal end of the first rake surface, which is defined by the intersection of the first rake surface with the second rake surface, exceeds 1.5 mm, the cutting load is increased, and the cutting edge becomes susceptible to chattering or fracturing. On the other hand, if the above distance is less than 0.5 mm, advantageous effects as described above cannot be expected.

DESCRIPTION OF THE PREFERRED EMBODIMENTS OF THE INVENTION

Figure 1:
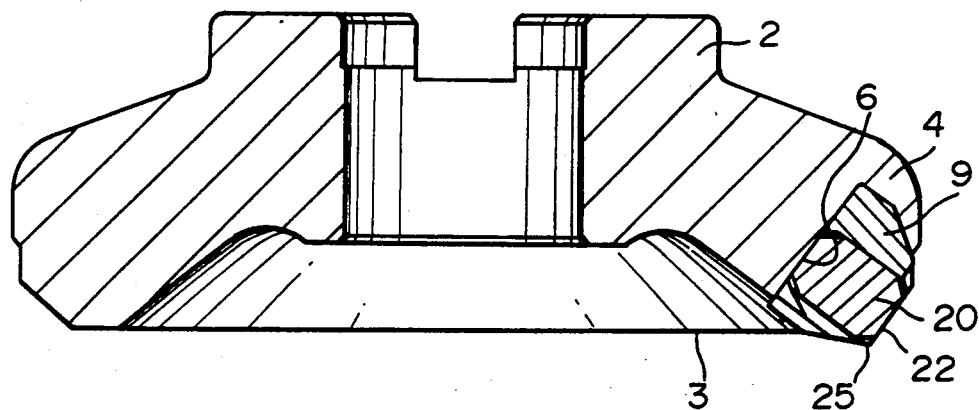
FIG. 1 is a cross-sectional view of a rotary cutter in accordance with an embodiment of the present invention.
Figure 2:
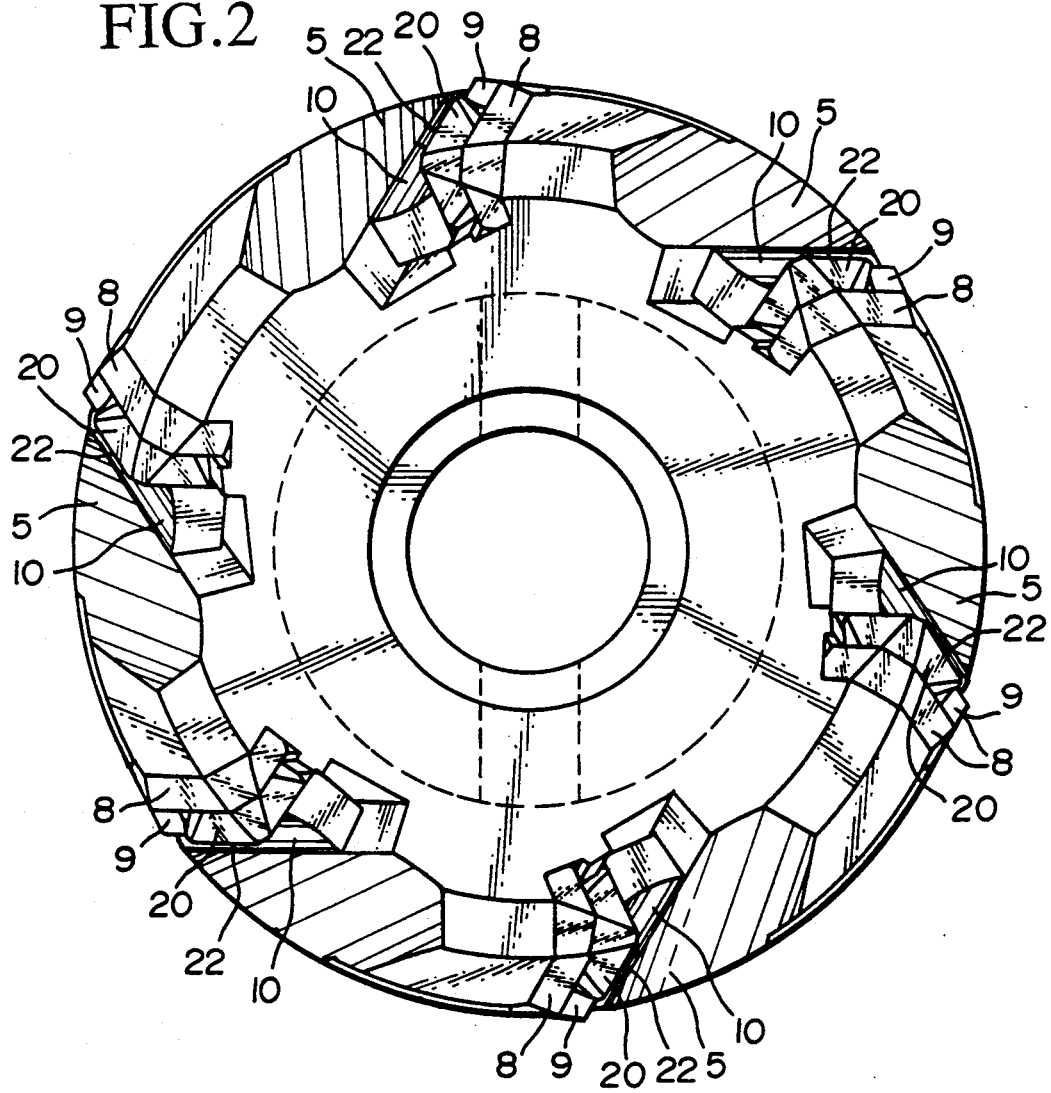
FIG. 2 is an end view of the rotary cutter of FIG. 1.
Figure 3:
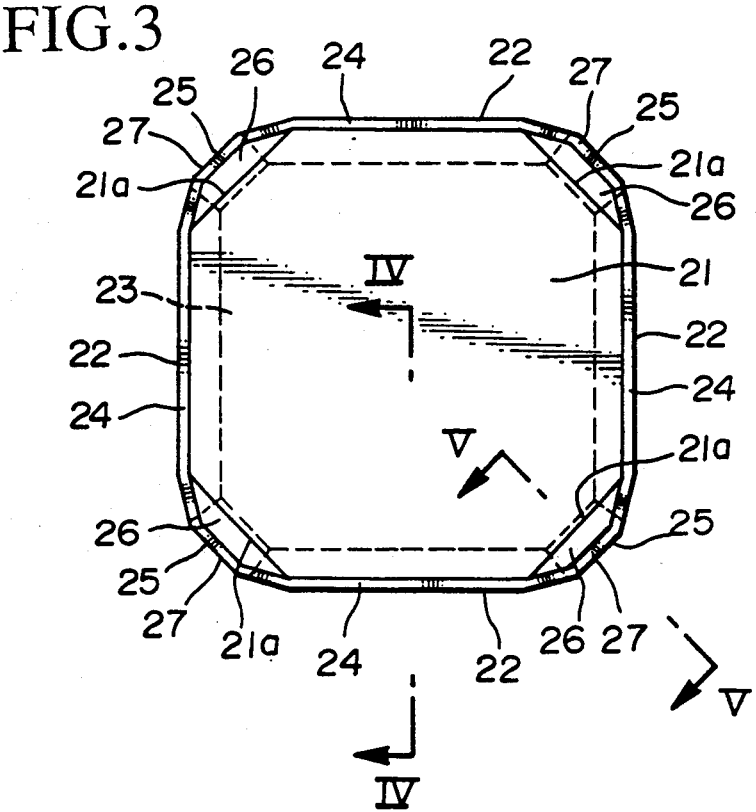
FIG. 3 is a plan view of a cutting insert used in the cutter of FIG. 1.
Figure 4:
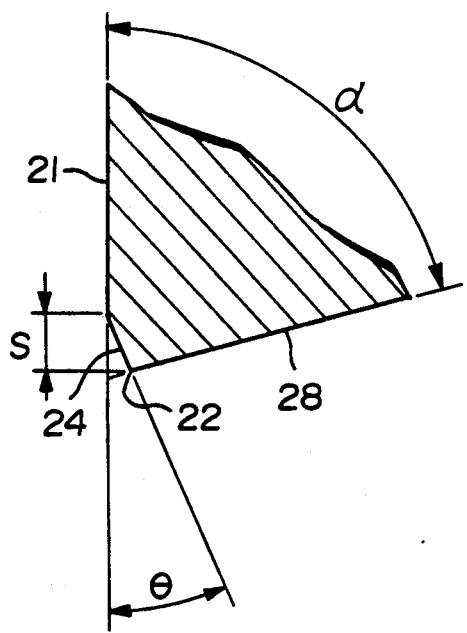
FIG. 4 is a cross-sectional view taken along the line IV—IV in FIG. 3.
Figure 5:
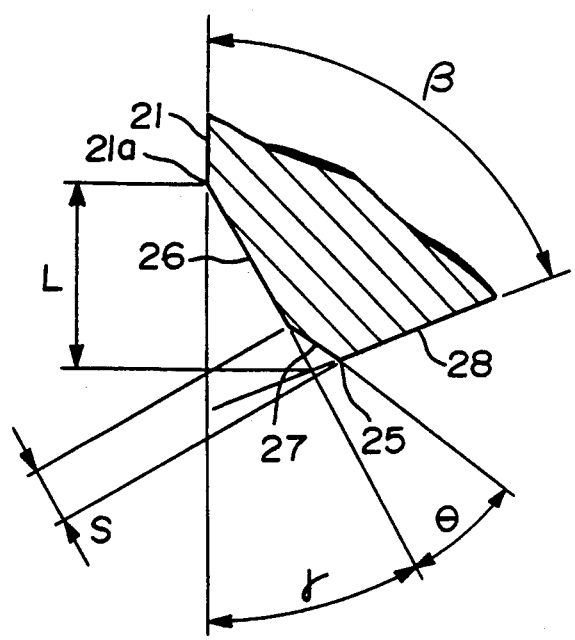
FIG. 5 is a cross-sectional view taken along the line V—V in FIG. 3.
Figure 6:
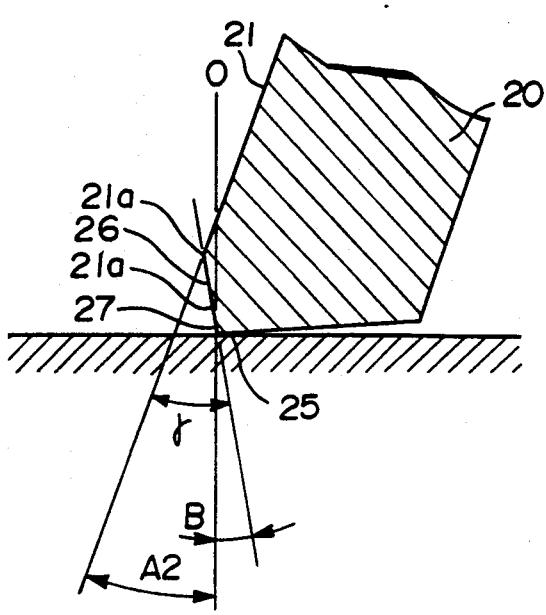
FIG. 6 is a cross-sectional view showing a relationship between a cutting edge and a workpiece.

FIGS. 1 to 7 depict a rotary cutter in accordance with a preferred embodiment of the present invention, in which the same reference numerals are used to designate the same parts or members as in the conventional cutter shown in FIGS. 8 to 13 in order to simplify the explanation thereof.

As in the case with the conventional rotary cutter, the rotary cutter in accordance with the present embodiment comprises a plurality of positive cutting inserts 20 of a generally square shape, which are received in and releasably secured to the insert receiving recesses 6, respectively. However, each cutting insert 20 differs from the conventional one in its construction.

More specifically, as is the case with the conventional one, each cutting insert 20 is provided with four main cutting edges 22 defined by the four marginal ridges of the front face which serves as a first rake surface 21. Each of the main cutting edges 22 is honed to provide a honed portion 24, which has the same width S and the same inclination angle $\theta$ with respect to the first rake surface 21 as in the conventional cutting insert. Furthermore, four corners of the square insert 20 are removed to provide four auxiliary cutting edges 25.

However, each of the auxiliary cutting edges 25 is disposed in a position displaced toward a rear face 23 (seating face) from a position corresponding to the main cutting edge 22, and a second rake surface 26, which is inclined with respect to the first rake surface 21 outwardly in a direction toward the rear face 23 at a prescribed inclination angle $\gamma$, is formed between each auxiliary cutting edge 25 and the first rake surface 21. In addition, the auxiliary cutting edge 25 is honed to provide a honed portion 27, which extends continuously from the honed portion 24 for the main cutting edge 22 and has the same width S and the same inclination angle $\theta$ with respect to the second rake surface 26 as the honed portion 24 for the main cutting edge 22. Furthermore, a distance L, measured in a direction parallel to the first rake surface 21 and defined between the auxiliary cutting edge 25a and a marginal end 21a of the first rake surface 21, i.e., the intersection of the first rake surface with the second rake surface, is set so as to range from 0.5 mm to 1.5 mm. Moreover, the angle defined between the first rake surface 21 and a relief surface 28 is set so as to be equal to the included angle $\beta$ of the cutting insert 7 of the conventional rotary cutter. However, the included angle of the auxiliary cutting edge 25, defined between the second rake surface 26 and the relief surface 28, is the summation of the aforesaid angles $\beta$ and $\gamma$, and hence the strength of the auxiliary cutting edge 25 is further enhanced.

The above cutting insert 20 is attached to each of the insert securing recesses 6 of the cutter body 2 such that the axial rake angle $A_2$ is no less than $+30°$, and the second rake surface is inclined axially forwardly of the body in a circumferential direction opposite to the direction of rotation of the body such that an angle B, defined between the second rake surface 26 and the axis 0 of the tool body 2 as viewed in a cross-section perpendicular to the auxiliary cutting edge 25, is no larger than $+20°$.

In the rotary cutter as described above, the second rake surface 26, which is planar and inclined with respect to the axis 0 of the tool body 2 at the angle B of no large than $+20°$, is formed between the first rake surface 21 and the auxiliary cutting edge 25. Therefore, even if a large axial rake angle $A_2$ of no less than $+30°$ is imparted to the auxiliary cutting edge 25, it comes to have a large included angle of no less than a prescribed value, i.e., generally of no less than 55°, while ensuring a predetermined relief angle. Accordingly, even though the axial rake angle is large (no less than $+30°$), the included angle of the auxiliary cutting edge 25 can be made large, so that the fracturing of the cutting edge can be efficiently avoided.

In the foregoing, if the angle B defined between the second rake angle 26 and the axis 0 of the tool body 2 exceeds $+20°$, the strength of the cutting edges deteriorates. Therefore, the angle B is set so as to be no larger than $+20°$. Furthermore, if the distance L between the marginal end 21a of the first rake surface 21 and the auxiliary cutting edge 25 exceeds 1.5 mm, the cutting load is unduly increased. On the other hand, if the distance L is less than 0.5 mm, the advantageous effects due to the provision of the second rake surface 26 cannot be expected.

Figure 7:
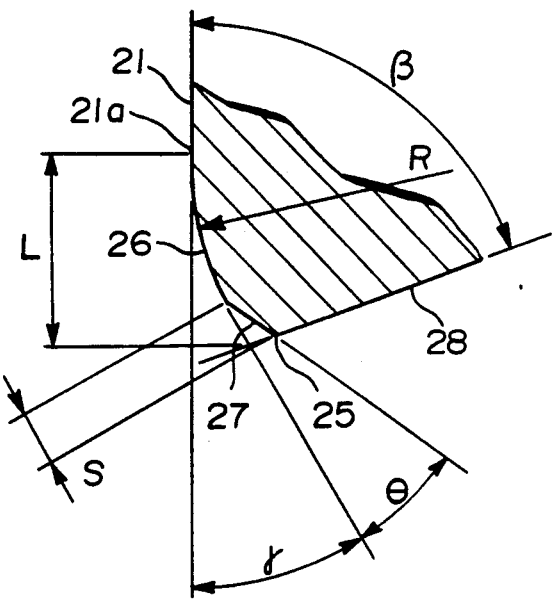
FIG. 7 is a cross-sectional view of a part of a cutting insert employed in a rotary cutter in accordance with a second embodiment of the present invention.
Figure 8:
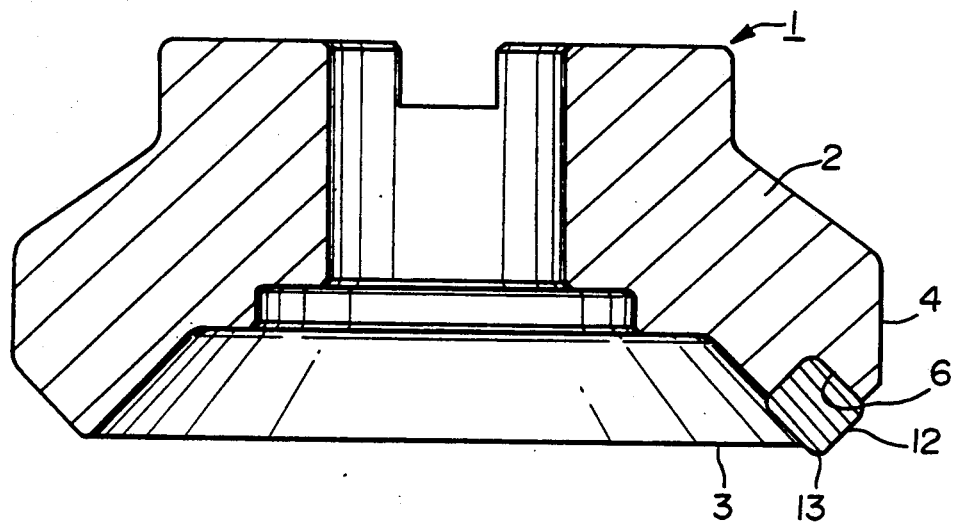
FIG. 8 is a cross-sectional view of a conventional rotary cutter.
Figure 9:
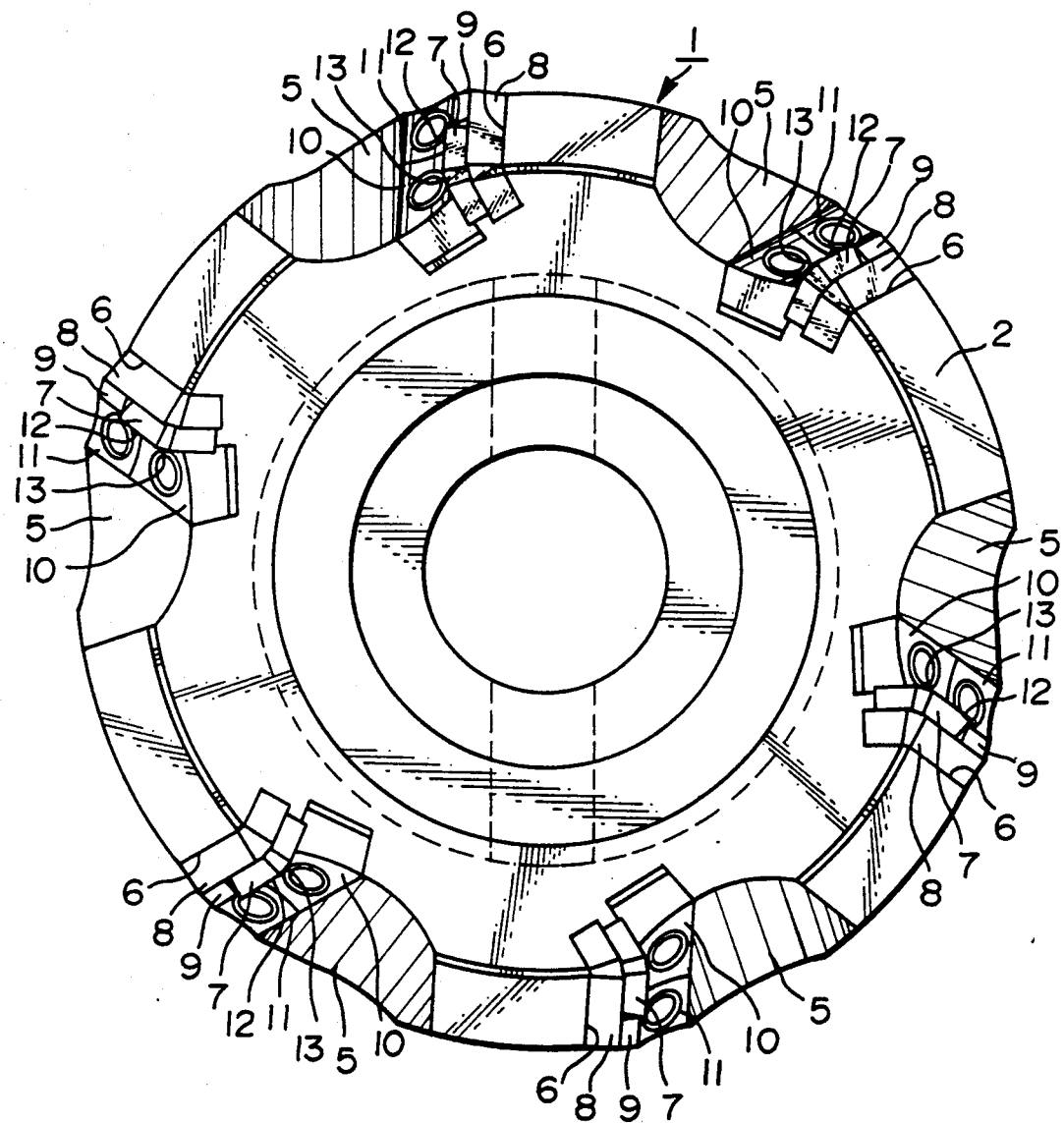
FIG. 9 is an end view of the rotary cutter of FIG. 8.
Figure 10:
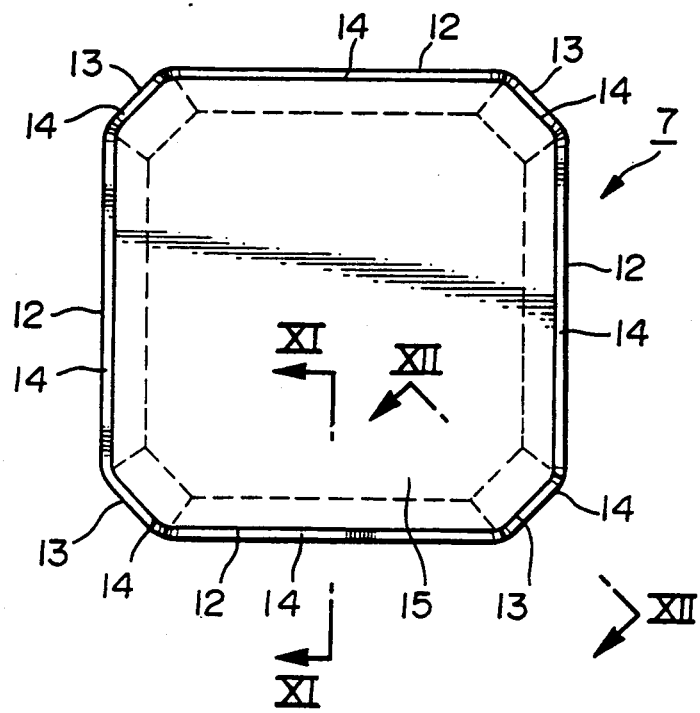
FIG. 10 is a plan view of a cutting insert employed in the rotary cutter of FIG. 8.
Figure 11:
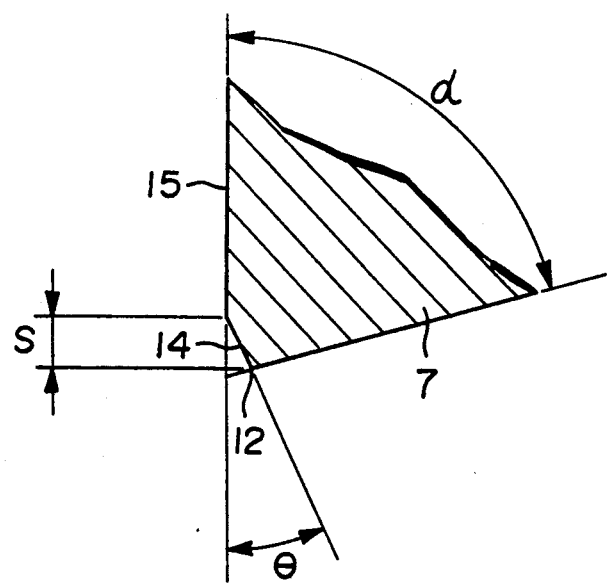
FIG. 11 is a cross-sectional view taken along the line XI—XI in FIG. 10.
Figure 12:
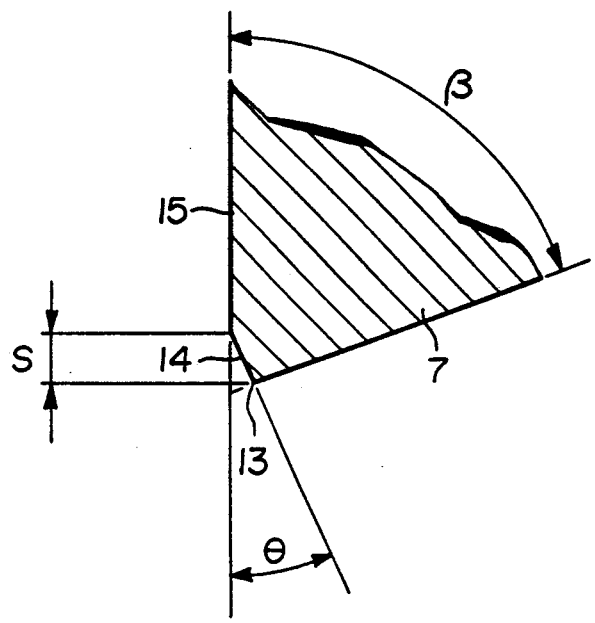
FIG. 12 is a cross-sectional view taken along the line XII—XII in FIG. 10.
Figure 13:
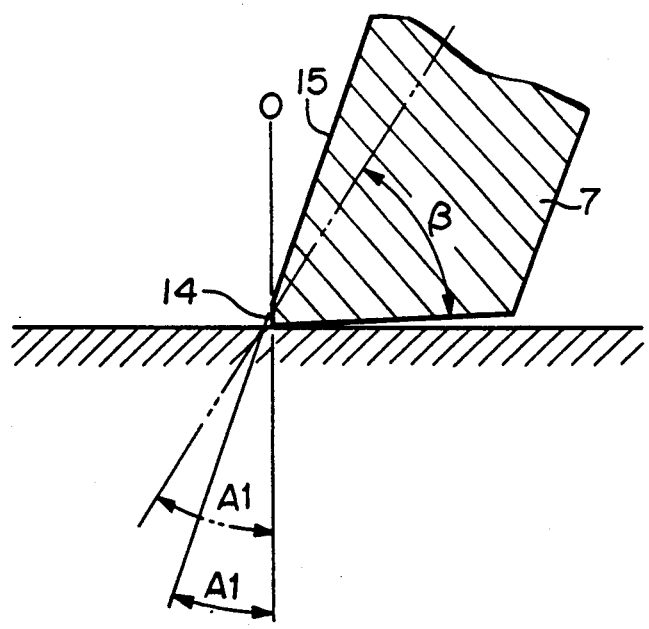
FIG. 13 is a cross-sectional view showing a relationship between a cutting edge of the cutter of FIG. 8 and a workpiece.

FIG. 7 depicts a second embodiment in accordance with the present invention which differs from the first embodiment only in the shape of the second rake surface. More specifically, the second rake surface, designated by the numeral 30 in this embodiment, is comprised of a curved surface of a generally arcuately convex shape as viewed in a cross-section perpendicular to the auxiliary cutting edge 25, and the tangential angle defined by the first rake surface 21 and a tangential line of the second rake surface 30 at the intersection with the honed portion 27 is set to $\gamma$. In addition, the distance L, measured in a direction parallel to the first rake surface 21 and defined between the marginal end 21a of the first rake surface 21 and the auxiliary cutting edge 25, is set so as to range from 0.5 mm to 1.5 mm. In the rotary cutter disclosed in this embodiment, the same advantages as in the first embodiment can be naturally expected. In addition, since the second rake surface 30 is arcuately curved, cutting chips produced during a cutting operation can be smoothly discharged.

Although in the first and second embodiments, the honed portions 24 and 27 are provided to enhance the strength of the cutting edges, they need not be provided in the case of a rotary cutter for cutting a workpiece of non-ferrous metal such as aluminum. In addition, the honing of the cutting edges may be carried out to provide convexly arcuately shaped honed portions.

Furthermore, the angle B defined between the second rake surface 26, 30 and the axis 0 of the tool body 2 may be negative as long as it is no larger than $+20°$. In particular, in the case where the workpiece is made of a material of great hardness, it is preferable that the angle B be negative.

Moreover, the shape of the second rake surface may be further modified. For example, it may be of a multistaged shape comprising a stepped structure having a plurality of flat faces.

Obviously, many modifications and variations of the present invention are possible in the light of the above teachings. For example, the present invention may be applicable to a rotary cutter of a solid type. It is therefore to be understood that within the scope of the appended claims, the invention may be practiced otherwise than as specifically described.

What is claimed is:

1. A rotary cutter comprising:
    a cutter body having an axis of rotation therethrough; and
    a cutting insert releasably secured to a forward end of said cutter body, said cutting insert having marginal ridges defining a main cutting edge and an auxiliary cutting edge, said main cutting edge being directed radially outwardly of said cutter body while said auxiliary cutting edge is directed axially forwardly of said cutter body;
    said cutting insert having faces defining a first rake surface and a second rake surface, said first rake surface being disposed adjacent to said main and auxiliary cutting edges such that an axial rake angle is no less than $+30°$, said second rake surface being disposed between said first rake surface and said auxiliary cutting edge such that an angle, defined between said second rake surface and said axis of rotation of said body as viewed in a cross-section perpendicular to said auxiliary cutting edge, is no larger than $+20°$, said second rake surface being formed such that a distance, measured in a direction parallel to said first rake surface and defined between said auxiliary cutting edge and the intersection of said first rake surface with said second rake surface, is set so as to range from 0.5 mm to 1.5 mm.

2. A rotary cutter as recited in claim 1, wherein each of said main and auxiliary cutting edges is honed to provide a honed portion.

3. A rotary cutter as recited in claim 1, wherein said second rake surface is planar.

4. A rotary cutter as receited in claim 1, wherein said second rake surface is generally arcuately, convexly curved as viewed in a cross-section perpendicular to said auxiliary cutting edge.

* * * * *